United States Patent
Lin et al.

(10) Patent No.: US 8,432,429 B2
(45) Date of Patent: Apr. 30, 2013

(54) MULTIMEDIA EFFECT PROCESSING DEVICE FOR VIDEOPHONE AND RELATED METHOD

(75) Inventors: Hsien-Chung Lin, Hsinchu County (TW); Chi-Peng Tai, Hsinchu County (TW)

(73) Assignee: Qisda Corporation, Shan-Ting Tsun, Gueishan Hsiang, Taoyuan County (TW)

( * ) Notice: Subject to any disclaimer, the term of this patent is extended or adjusted under 35 U.S.C. 154(b) by 1075 days.

(21) Appl. No.: 12/195,386

(22) Filed: Aug. 20, 2008

(65) Prior Publication Data

US 2009/0051753 A1 Feb. 26, 2009

(30) Foreign Application Priority Data

Aug. 23, 2007 (TW) .............................. 96131213 A

(51) Int. Cl.
*H04M 11/00* (2006.01)

(52) U.S. Cl.
USPC ..................................... 348/14.01; 455/556.1

(58) Field of Classification Search .... 348/14.01–14.09, 348/14.11–14.13; 709/204
See application file for complete search history.

(56) References Cited

U.S. PATENT DOCUMENTS

| | | | | |
|---|---|---|---|---|
| 6,906,741 | B2 * | 6/2005 | Canova et al. | 348/14.08 |
| 2003/0103524 | A1 | 6/2003 | Hasegawa | |
| 2006/0152575 | A1 * | 7/2006 | Amiel et al. | 348/14.01 |

FOREIGN PATENT DOCUMENTS

| | | |
|---|---|---|
| CN | 1285678 A | 2/2001 |
| CN | 1747546 A | 3/2006 |

* cited by examiner

*Primary Examiner* — Curtis Kuntz
*Assistant Examiner* — Maria El-Zoobi
(74) *Attorney, Agent, or Firm* — Winston Hsu; Scott Margo

(57) ABSTRACT

The present invention discloses a videophone for displaying a first multimedia data, wherein the videophone communicates with a remote videophone. The videophone includes a database, a processing unit and an output unit. The database stores a plurality of multimedia files. The processing unit is coupled to the database, for selecting a second multimedia file from the database according to a first control signal, and integrating the first multimedia data with the second multimedia file into a first integrating data, wherein the first control signal is generated by the remote videophone. The output unit is coupled to the processing unit, for outputting the first integrating data.

20 Claims, 6 Drawing Sheets

MULTIMEDIA EFFECT PROCESSING DEVICE FOR VIDEOPHONE AND RELATED METHOD

BACKGROUND OF THE INVENTION

1. Field of the Invention

The present invention relates to a multimedia effect processing device and related method for a videophone, and more particularly to a multimedia effect processing device and related method using transmission of control signal to make both videophones to display an identical multimedia effect.

2. Description of the Prior Art

A videophone is a kind of telecommunication technologies, which simultaneously transmits real-time images and speech data through duplex transmission, and is widely applied in wired and wireless communication systems. For example, the videophone can establish communication through $3^{rd}$ generation mobile communication network or voice over Internet Protocol (VoIP). A widely-used communication protocol for the videophone is a transmission protocol H.323, which is defined by ITU-T (International Telecommunication Standardization Sector), and includes protocols of data transmission, control and coding. For example, a protocol H.255.0 defines signaling transmission when establishing connection, a protocol H.261 defines related image coding schemes, and a protocol H.245 defines processes of multimedia control and management. In addition, a real-time transport protocol (RTP) and RTP control protocol (RTCP) also defines functions of the videophone.

Due to the great potential of the videophone, related applications of the videophone do not mature yet. The protocol H.245 and RTCP also reserve control signals to be defined. Presently, undefined signaling resources can be defined according to user's demand.

SUMMARY OF THE INVENTION

The present invention provides a multimedia effect processing device and related method for a videophone, which make both videophones display an identical multimedia effect through transmission of control signals for saving the bandwidth.

The present invention discloses a videophone for displaying a first multimedia data, wherein the videophone communicates with a remote videophone. The videophone comprises a database, a processing unit and an output unit. The database stores a plurality of multimedia files. The processing unit is coupled to the database, for selecting a second multimedia file from the database according to a first control signal, and integrating the first multimedia data with the second multimedia file into a first integrating data, wherein the first control signal is generated by the remote videophone. The output unit is coupled to the processing unit, for outputting the first integrating data.

The present invention discloses a multimedia effect processing method for a videophone for displaying a first multimedia data, wherein the videophone communicates with a remote videophone. The multimedia effect processing method comprises storing a plurality of multimedia files in a database, selecting a second multimedia file from the database according to the a first control signal generated by the remote videophone, integrating the first multimedia data with the second multimedia file into a first integrating data, and outputting the first integrating data.

DETAILED DESCRIPTION

Figure 1:
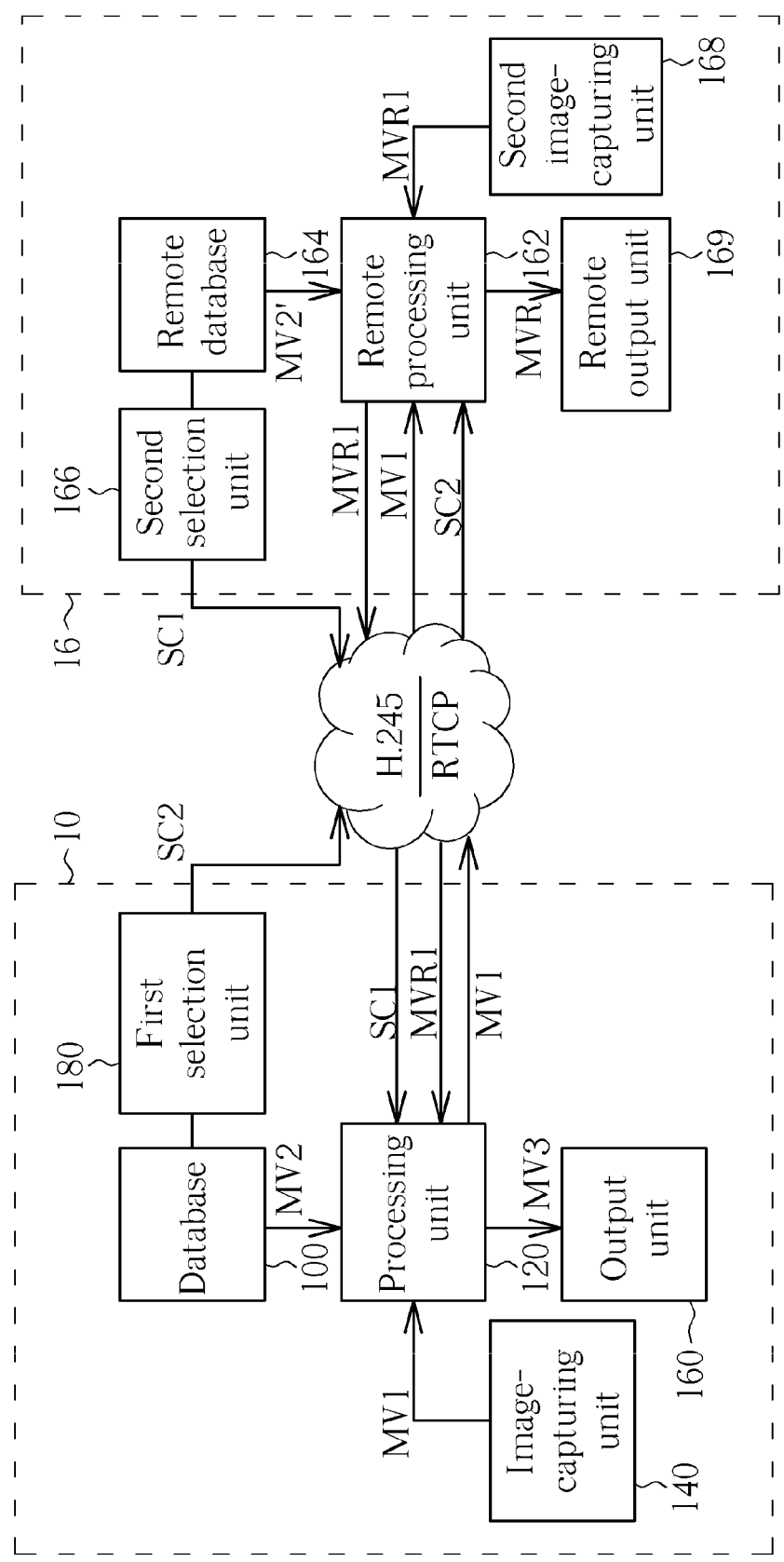
FIG. 1 is a schematic diagram of a videophone according to an embodiment of the present invention.

Please refer to FIG. 1, which is a schematic diagram of a videophone according to an embodiment of the present invention. The videophone 10 comprises a database 100, a processing unit 120, an image-capturing unit 140, an output unit 160 and a first selection unit 180. The videophone 10 utilizes the image-capturing unit 140 for capturing a first multimedia data MV1, and transmits the captured image to the remote videophone for performing a video communication. The database 100 stores a plurality of multimedia files, such as voice files, image files or video files. The processing unit 120 selects a second multimedia file MV2 from the database 100 according to a first control signal SC1, and integrates the first multimedia data MV1 with the second multimedia file MV2 into a first integrating data MV3. The output unit 160 can be a monitor or a voice output device, like a speaker, and is utilized for outputting the first integrating data MV3 for the user for enjoying the multimedia effect. In addition, when the videophone 10 generates the multimedia effect, the videophone 10 controls the first selection unit 180 to select a multimedia file from the database 100 through input devices, such as a keypad, a voice device or a hand-writing device, and generates a second control signal SC2. The first control signal SC1 is generated by a decoding process according to a transmission protocol after being received, while the second control signal SC2 is outputted after undergoing an encoding process according to a transmission protocol. For example, when the videophone 10 is used in $3^{rd}$ generation mobile communication network, the control signals SC1 and SC2 are encoded or decoded according to a protocol H.245; when the videophone 10 is used in Voice over IP (VoIP), the control signals SC1 and SC2 are encoded or decoded according to a real-time control (RTCP) protocol. Since VoIP and RTCP reserve many signals to be defined by users, the embodiment of the present invention can use these two protocols to implement the transmission of the first control signal SC1 and the second control signal SC2. Therefore, the videophone 10 can add a multimedia effect on an original image or voice, for example, add a heart pattern or a beating animation on an image, scale a part of image size, change voice to a duck-like voice or change the level of tones.

On the other hand, a remote videophone 16 is similar to the videophone 10, and comprises a remote processing unit 162, a remote database 164, a second selection unit 166, a second image-capturing unit 168 and a remote output unit 169. The remote database 164 stores multimedia files which are the same as those multimedia files stored in the database 100 of the videophone 100, and therefore the remote videophone 16 can plays the same multimedia effects as the videophone 10 plays. The remote videophone 16 utilizes the second image-capturing unit 168 for capturing a first remote multimedia data MVR1, and transmits the first remote multimedia data MVR1 to the videophone 10. As a result, the videophone 10 receives the first remote multimedia data MVR1 and sees a local image of the remote videophone 16, while the remote videophone 16 receives the first multimedia data MV1 and sees a local image of the videophone 10. When the remote videophone 16 is going to perform a multimedia effect to the videophone 10, the second selection unit 166 selects a second remote multimedia file MV2' which is the same as the second multimedia file from the remote database 164 and generates the first control signal SC1 according to the second remote multimedia file MV2'. Similar to the second control signal SC2, the first control signal SC1 is encoded according to the protocol H.245 or the real-time control protocol and then outputted. In addition, after the remote videophone 16 receives the first multimedia data MV1, the remote processing unit 162 integrates the first multimedia data MV1 with the second remote multimedia file MV2' into a remote integrating data MVR, and outputs the remote integrating data MVR to the remote output unit 169. The remote integrating data MVR is identical to the first integrating data MV3. Consequently, the videophone 10 and the remote videophone can simultaneously output an identical multimedia effect.

Figure 2:
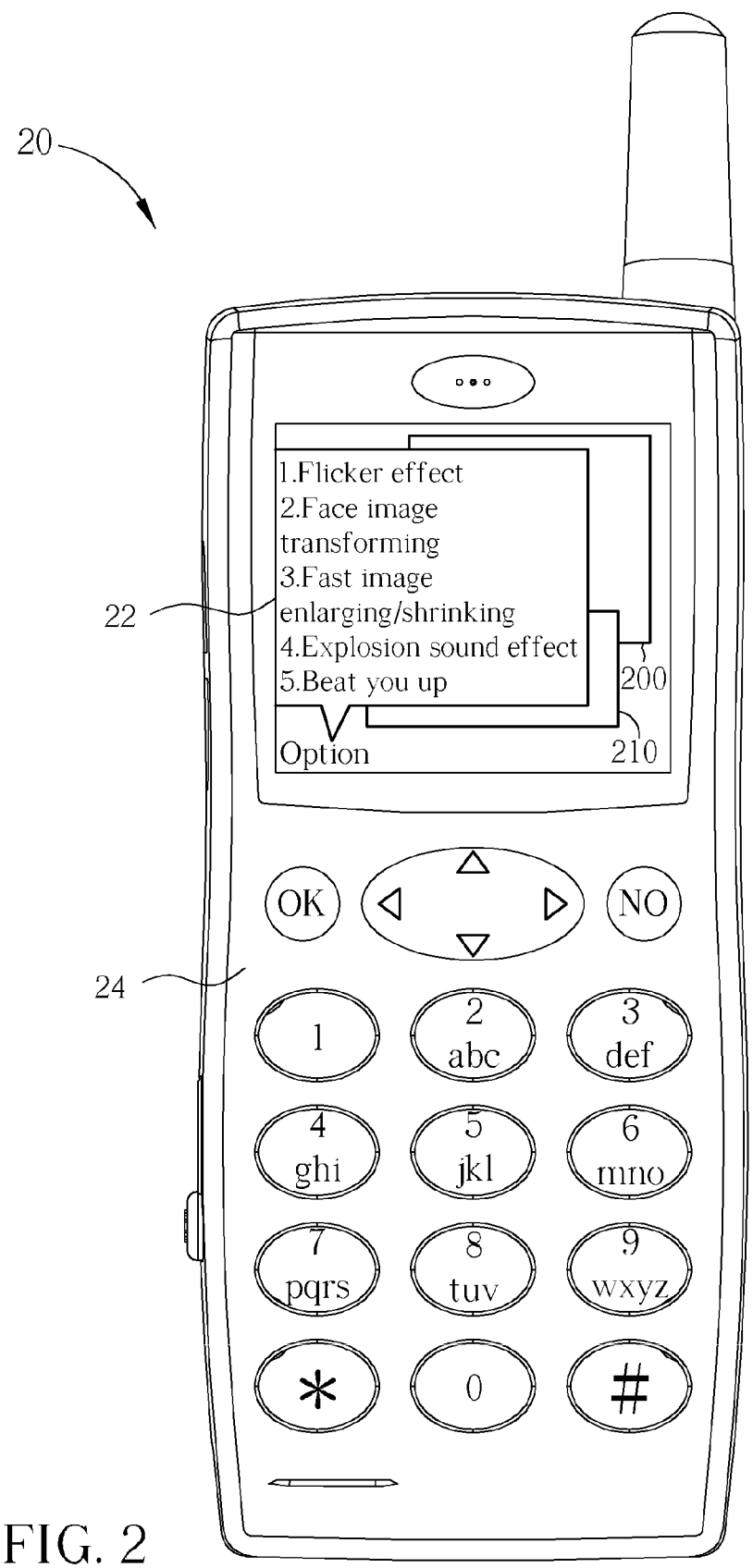
FIG. 2 is a schematic diagram of a mobile communication device according to an embodiment of the present invention.

The videophone 10 can be any kind of communication device, such as a mobile phone, a personal digital assistant, etc. For example, please refer to FIG. 2. FIG. 2 is a schematic diagram of a mobile communication device 20 according to an embodiment of the present invention. The mobile communication device 20 comprises a monitor 22 and a keyboard 24. The monitor 20 displays a large window 200 and a small window 210. The large window 200 is utilized for displaying an image of remote side, such as an image of the other person, while the small window 210 is utilized for displaying an image of local side, such as an image of a person who self. In addition, in the monitor 22, there is an "Option" function offering selection items 1 to 5, which present five different kinds of videophone multimedia effects. For example, item 1 is a flicker effect and utilized for making a communication image flickering, item 4 is an explosion sound effect and utilized for adding explosion sound in communication. The user pushes one of the selection key items 1 to 5 of the keyboard 24, to select a corresponding multimedia file and integrate the multimedia file with a real-time communication image for a multimedia effect. The user can select a multimedia effect to perform on the large window 200 or on the small window 210. For example, if the user selects the item 1, a flicker effect, to perform on an image of the other person, the large window 200 of monitor 22 will display the flicker effect. Meanwhile, if the remote videophone is a mobile communication device with the same functions as the mobile communication device 20, the small window of the remote communication device will simultaneously display the flicker effect. Therefore, the situation that the user selects a multimedia effect to perform on the image of the user himself means changing the image of the small window 210 on the mobile communication device 20, and the situation that the user selects a multimedia effect to perform on image of the other person means changing image of the large window 200 on the mobile communication device 20.

Figure 3:
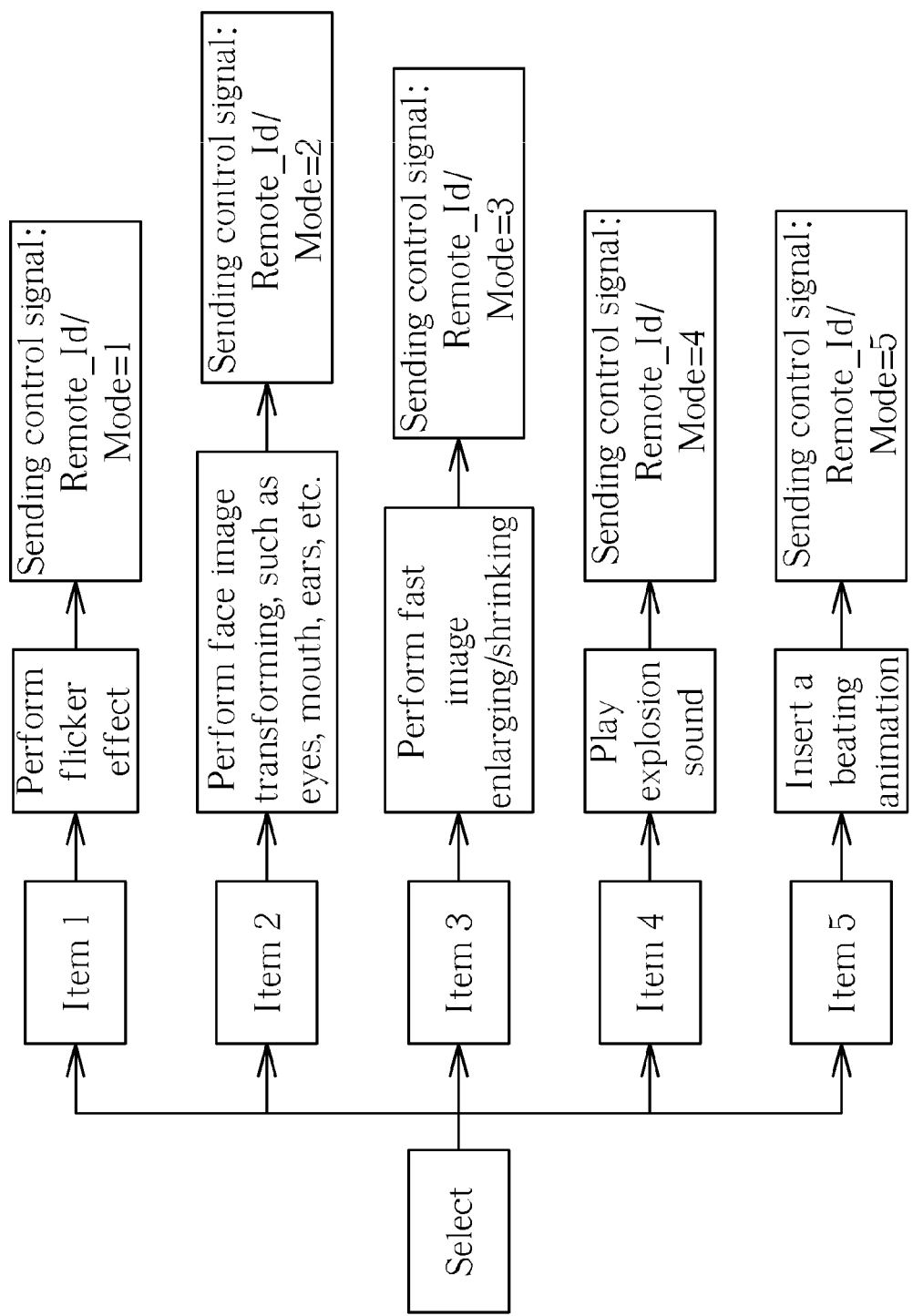
FIG. 3 and FIG. 4 are schematic diagrams of control signals according to different items in FIG. 2.
Figure 4:
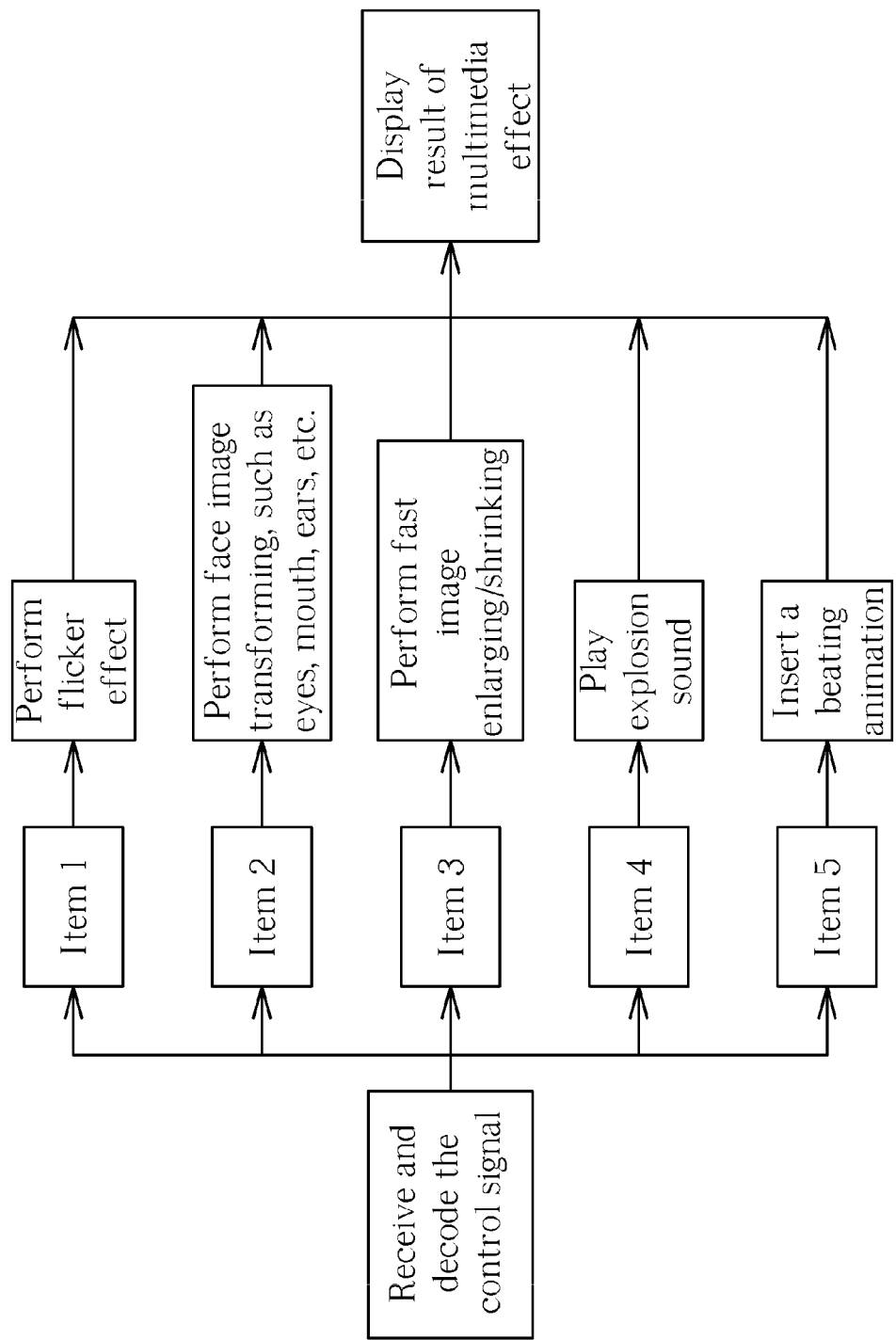

Please refer to FIG. 3 and FIG. 4. FIG. 3 and FIG. 4 are schematic diagrams of control signals corresponding to different items in FIG. 2. As shown in FIG. 3, control signals of each item comprise a remote communication identification and an item mode number. For example, the mode number is 1 corresponding to item 1; the mode number is 2 corresponding to item 2, and so forth. As a result, the user selects a desired multimedia file through the keypad and generates the related control signal. In addition, as shown in FIG. 4, the communication device receives a control signal from the remote communication device through internet, decodes the control signal according to related internet protocols, performs a multimedia effect to the communication image and at last, shows the result of the multimedia effect.

Figure 5:
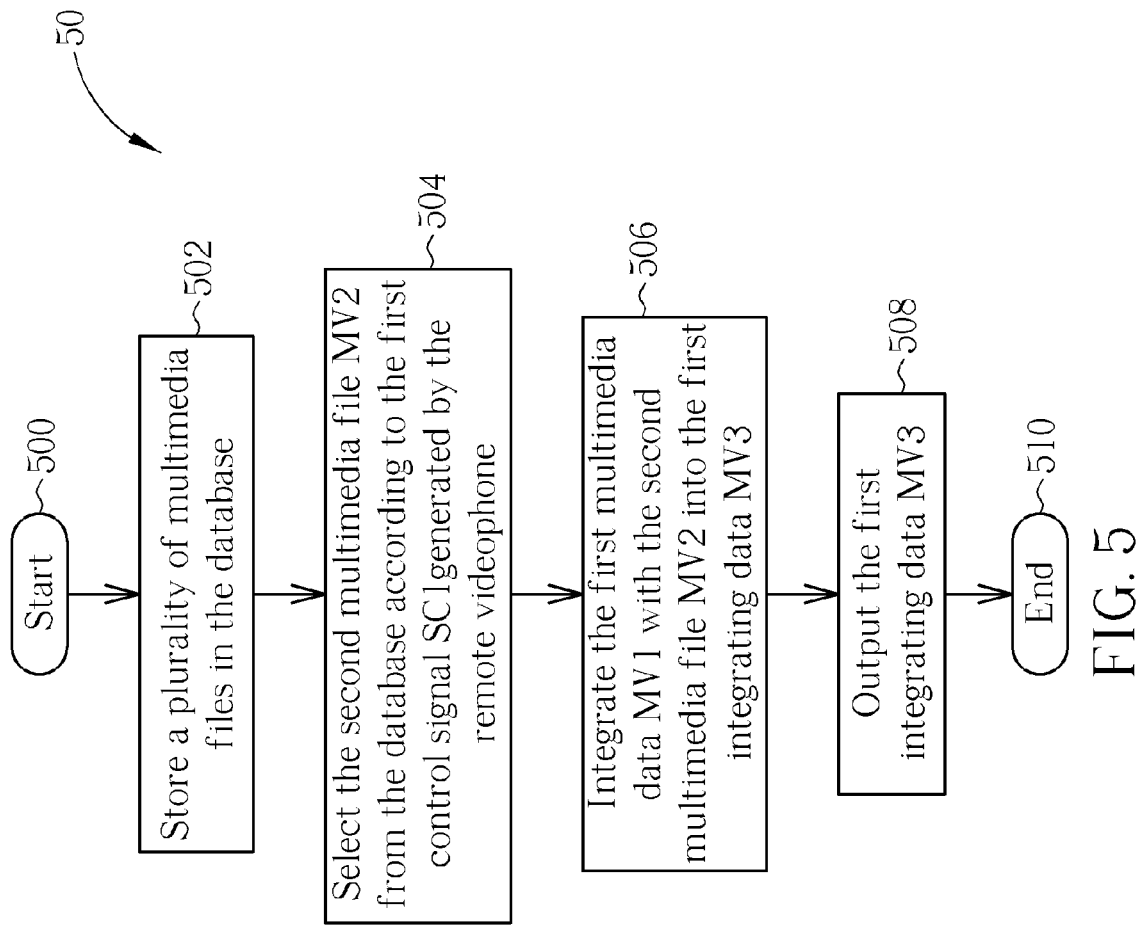
FIG. 5 is a flow chart of a multimedia effect process for a videophone according to the present invention.

Please refer to FIG. 5. FIG. 5 is a flow chart of a multimedia effect process 50 for a videophone according to the present invention. The multimedia effect process 50 is illustrated for the videophone 10 in FIG. 1, and comprises the following steps:

Step 500: Start.
Step 502: Store a plurality of multimedia files in the database 100.
Step 504: Select a second multimedia file MV2 from the database 100 according to the first control signal SC1 generated by the remote videophone 16.
Step 506: Integrate the first multimedia data MV1 with the second multimedia file MV2 into a first integrating data MV3.
Step 508: Output the first integrating data MV3.
Step 510: End.

According to the process 50, the multimedia file can be a voice file, an image file or a video file. If the videophone 10 is going to generate a multimedia effect, the videophone 10 selects a multimedia file through a keyboard, a voice device or handwriting device, and generates a second control signal SC2 according to the multimedia file. Afterwards, the second control signal SC2 is encoded according to the protocol H.245 or the real-time control protocol and then outputted. In order to display an identical multimedia effect, the process 50 is simultaneously performed in the videophone 10 and the remote videophone 16. As a result, the embodiment of the present invention can make both videophones display an identical multimedia effect, as long as through transmission of control signal.

Figure 6:
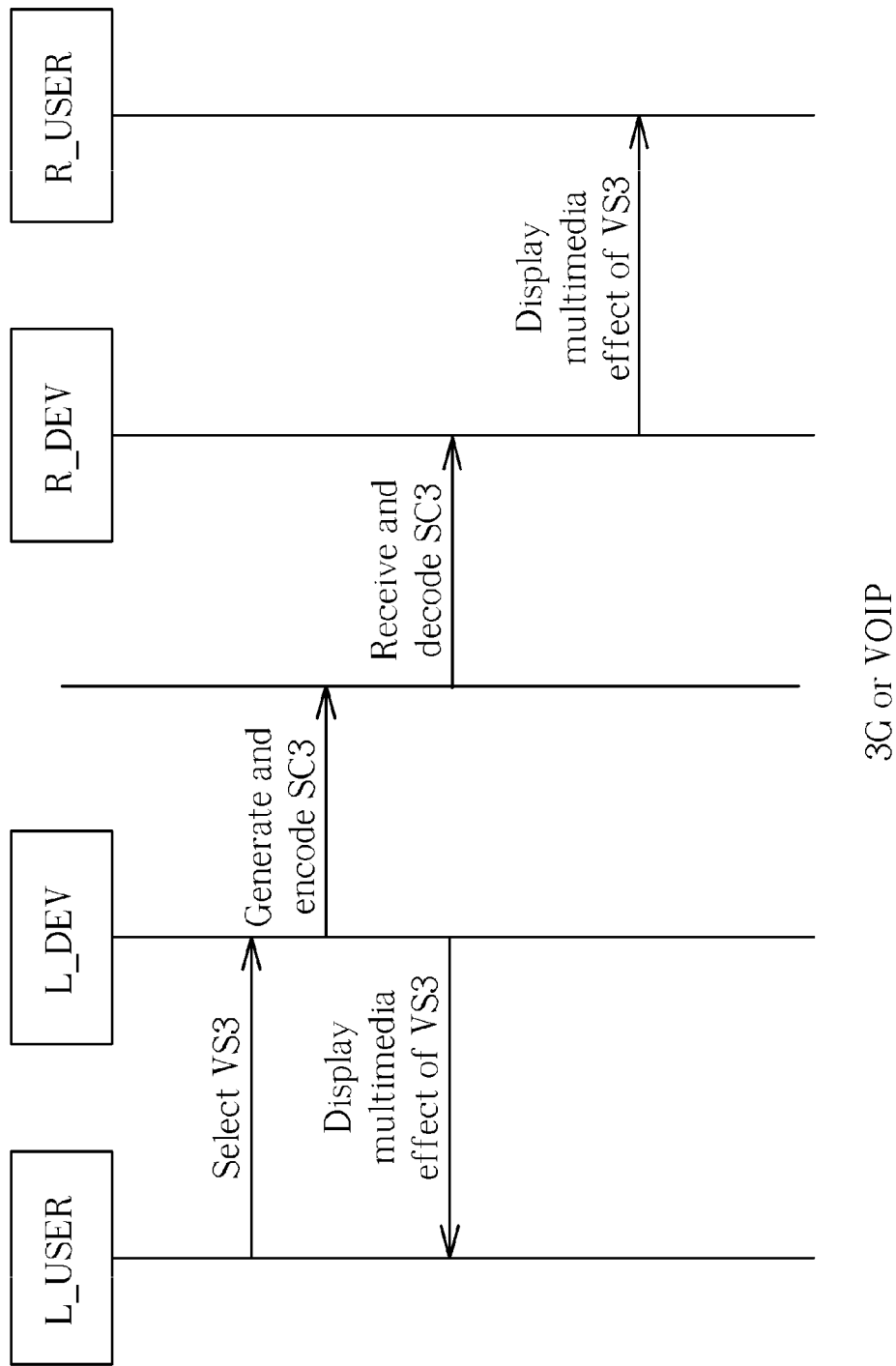
FIG. 6 is a schematic diagram of a multimedia effect process according to an embodiment of the present invention.

Please refer to FIG. 6. FIG. 6 is a schematic diagram of a multimedia effect process 60 according to an embodiment of the present invention. The multimedia effect process 60 comprises a local user L_USER, a local videophone device L_DEV, a remote videophone device R_DEV and a remote user R_USER. When the local user L_USER wants to output a multimedia file VS3, the local user L_USER can trigger the local videophone device L_DEV through a related function to select the multimedia file VS3. The local videophone device L_DEV displays the multimedia effect for the local user L_USER, generates a control signal SC3 correspondingly, encodes the control signal SC3 through the $3^{rd}$ generation mobile communication network or the VoIP, and transmits the encoded signal to the remote videophone device R_DEV. After receiving the control signal SC3, the remote videophone device R_DEV performs the decoding process, selects the multimedia file VS3 in the remote database, and at last, outputs the multimedia file VS3 for the remote user R_USER.

In conclusion, the present invention only utilizes transmission of control signal to make both videophones to select an identical multimedia file, and integrates the identical multimedia file into the real-time communication video for displaying an identical multimedia effect, so as to save the transmission bandwidth and time cost of image processing.

Those skilled in the art will readily observe that numerous modifications and alterations of the device and method may be made while retaining the teachings of the invention.

What is claimed is:
1. A videophone for displaying a first multimedia data, the videophone communicating with a remote videophone, the videophone comprising:
a database for storing a plurality of multimedia files;

a processing unit coupled to the database, for selecting a second multimedia file from the database according to a first control signal generated by the remote videophone, and for integrating the first multimedia data with the second multimedia file into a first integrating data; and an output unit coupled to the processing unit, for outputting the first integrating data.

2. The videophone of claim 1 further comprising an image-capturing unit coupled to the processing unit, for capturing the first multimedia data.

3. The videophone of claim 1, wherein the videophone and the remote videophone simultaneously display the first integrating data.

4. The videophone of claim 1, wherein the remote videophone comprises a remote database for storing multimedia files, which are the same as the plurality of multimedia files stored in the database of the videophone.

5. The videophone of claim 4, wherein the remote videophone comprises a remote processing unit and is utilized for receiving the first multimedia data from the videophone, the remote processing unit selects a remote multimedia file which is the same as the second multimedia file from the remote database and integrates the first multimedia data with the remote multimedia file into a remote integrating data identical to the first integrating data.

6. The videophone of claim 1, wherein the remote videophone comprises a second selecting unit for selecting a remote multimedia file which is the same as the second multimedia file and generating the first control signal according to the remote multimedia file.

7. The videophone of claim 1, wherein the remote videophone comprises a second image-capturing unit for capturing the first multimedia data, and the remote videophone transmits the first multimedia data to the videophone.

8. The videophone of claim 1 further comprising a first selecting unit coupled to the database, for selecting a first multimedia file from the database and generating a second control signal according to the first multimedia file.

9. The videophone of claim 8, wherein the second control signal is encoded and then transmitted according to H.245 control protocol.

10. The videophone of claim 8, wherein the second control signal is encoded and then transmitted according to real-time control protocol.

11. A video processing method for a videophone, for displaying a first multimedia data, the videophone communicating with a remote videophone and comprising a database for storing a plurality of multimedia files, the video processing method comprising:

selecting a second multimedia file from the database according to a first control signal generated by the remote videophone;

integrating the first multimedia data with the second multimedia file into a first integrating data; and outputting the first integrating data.

12. The video processing method of claim 11 further comprising capturing the first multimedia data.

13. The video processing method of claim 11 further comprising simultaneously displaying the first integrating data by the videophone and the remote videophone.

14. The video processing method of claim 11, wherein the remote videophone comprises a remote database for storing multimedia files, which are the same as the plurality of multimedia files stored in the database of the videophone.

15. The video processing method of claim 14 further comprising:

receiving the first multimedia data generated by the videophone by the remote videophone;

selecting a remote multimedia file which is the same as the second multimedia file from the remote database by the remote videophone; and integrating the first multimedia data with the remote multimedia file into a remote integrating data identical to the first generating data by the remote videophone.

16. The video processing method of claim 11 further comprising:

selecting a remote multimedia file which is the same as the second multimedia file by the remote videophone; and generating the first control signal according to the remote multimedia file by the remote videophone.

17. The video processing method of claim 11 further comprising capturing and then transmitting the first multimedia data to the videophone by the remote videophone.

18. The video processing method of claim 11 further comprising selecting a first multimedia file from the database, and generating a second control signal according to the first multimedia file.

19. The video processing method of claim 18, wherein the second control signal is encoded and then transmitted according to H.245 control protocol.

20. The video processing method of claim 18, wherein the second control signal is encoded and then transmitted according to real-time control protocol.

\* \* \* \* \*